Figure 1:
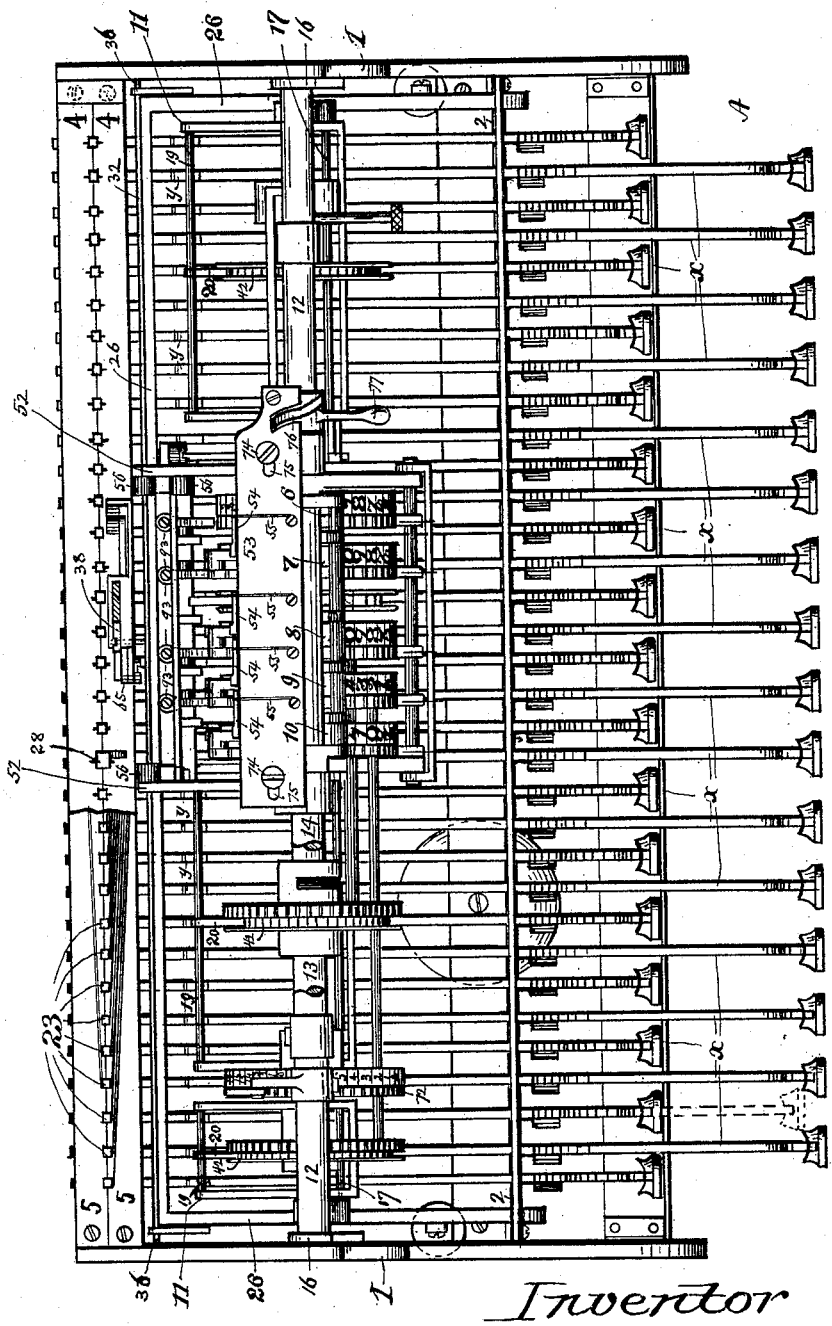

(No Model.)

11 Sheets—Sheet 1.

J. F. PFEFFER.
CASH REGISTER.

No. 468,945.

Patented Feb. 16, 1892.

Attest:
Alfred M. Harrison
W. L. Hosea

Inventor
John F. Pfeffer
By R. M. Hosea
Atty.

(No Model.) 11 Sheets—Sheet 2.

J. F. PFEFFER
CASH REGISTER.

No. 468,945. Patented Feb. 16, 1892.

Attest:
Alfred M. Harrison
Wm G. Hosea

Inventor
John F. Pfeffer
By L. M. Hosea
Attorney

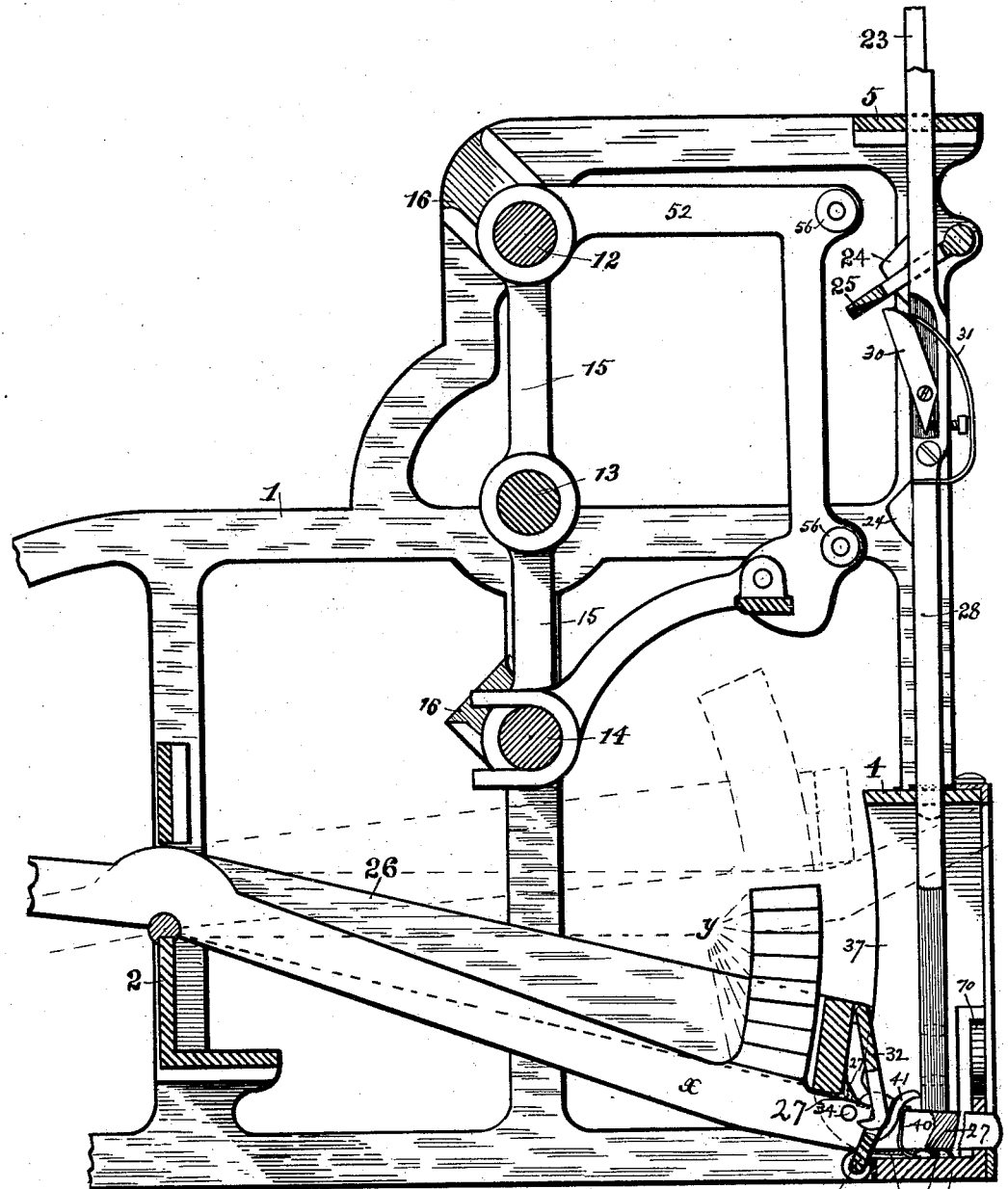

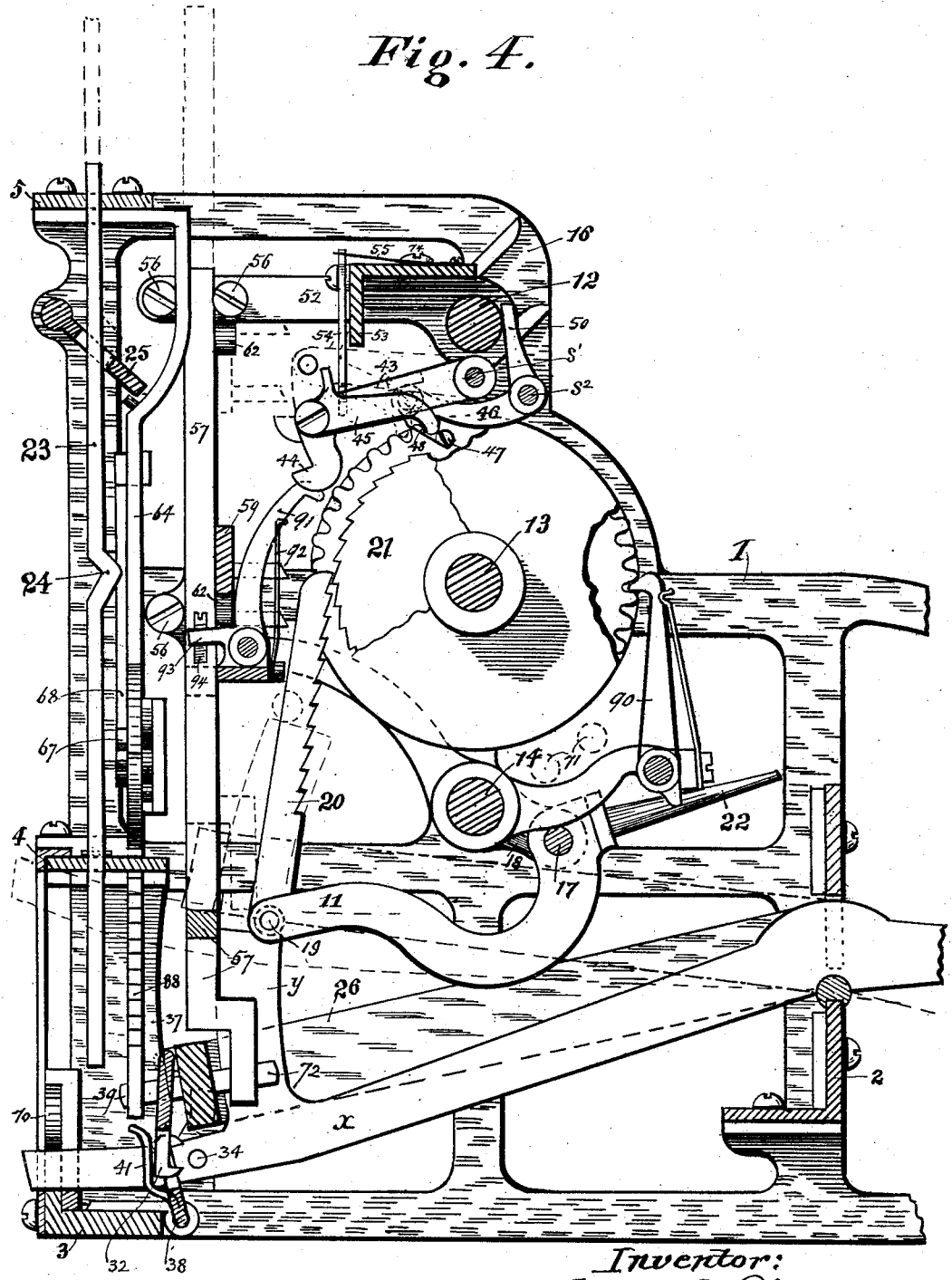

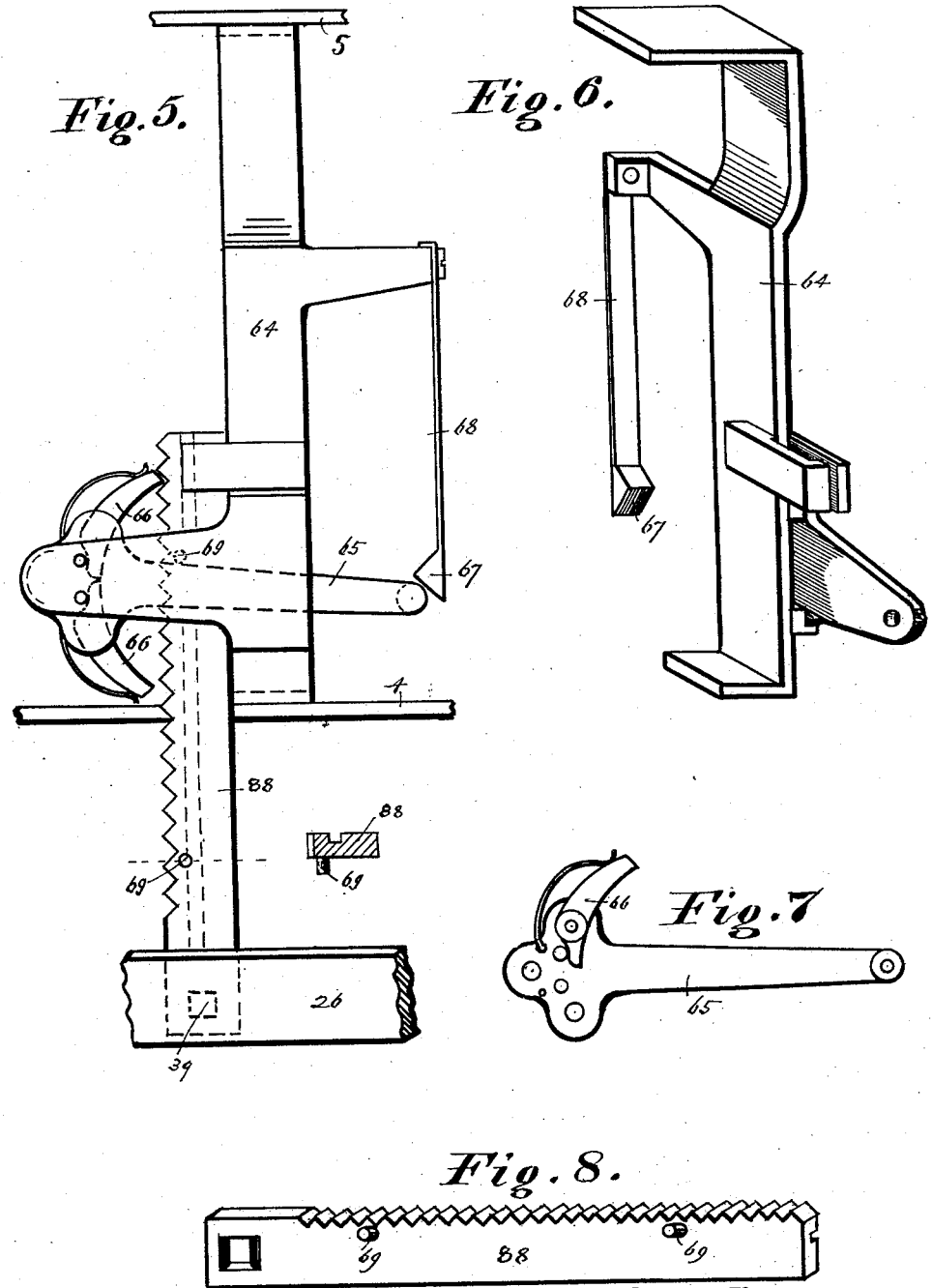

(No Model.) 11 Sheets—Sheet 6.
J. F. PFEFFER.
CASH REGISTER.
No. 468,945. Patented Feb. 16, 1892.
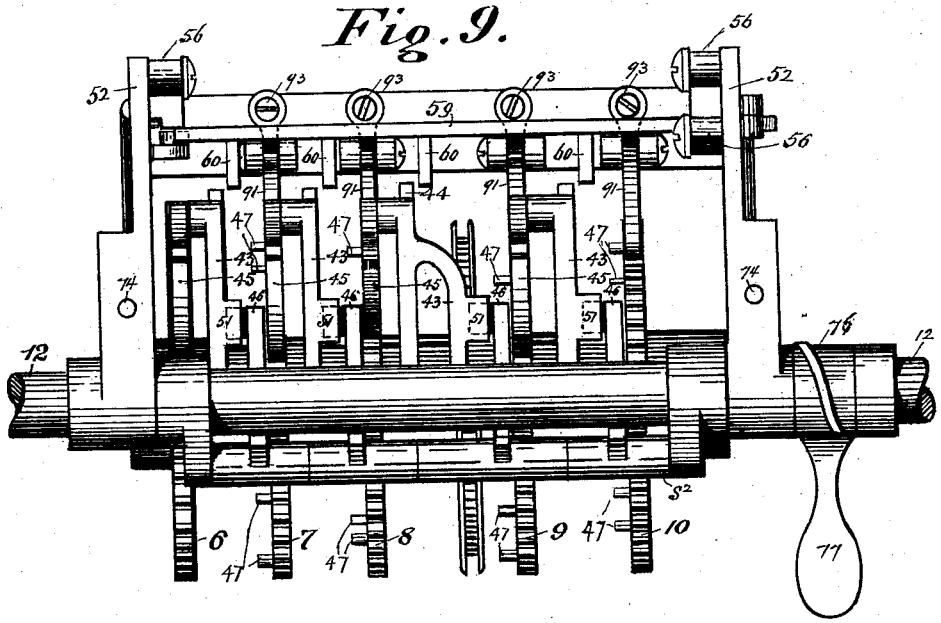
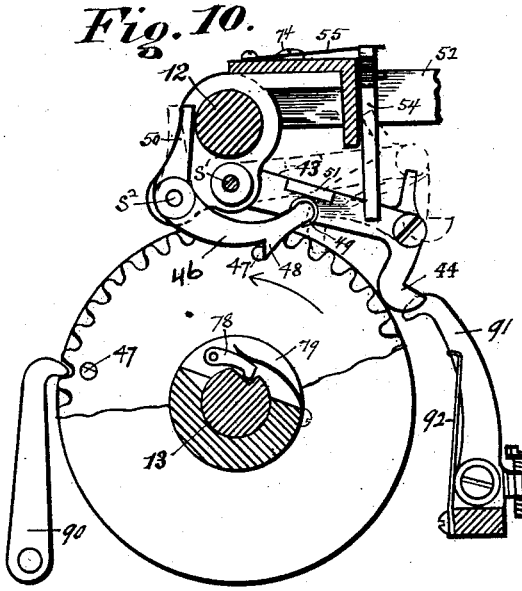
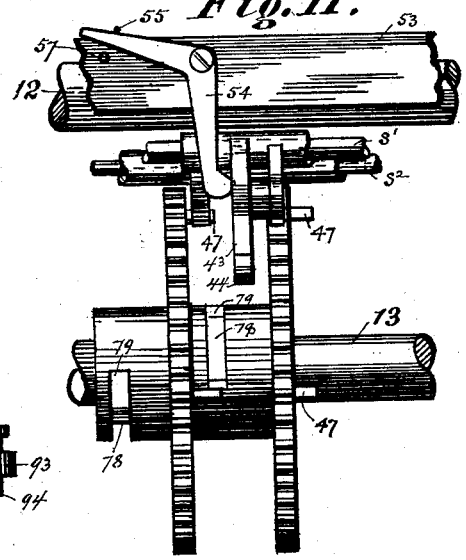
Attest:
Alfred M. Harrison
Wm G. Hosea
Inventor:
John F. Pfeffer
by L. M. Hosea
atty

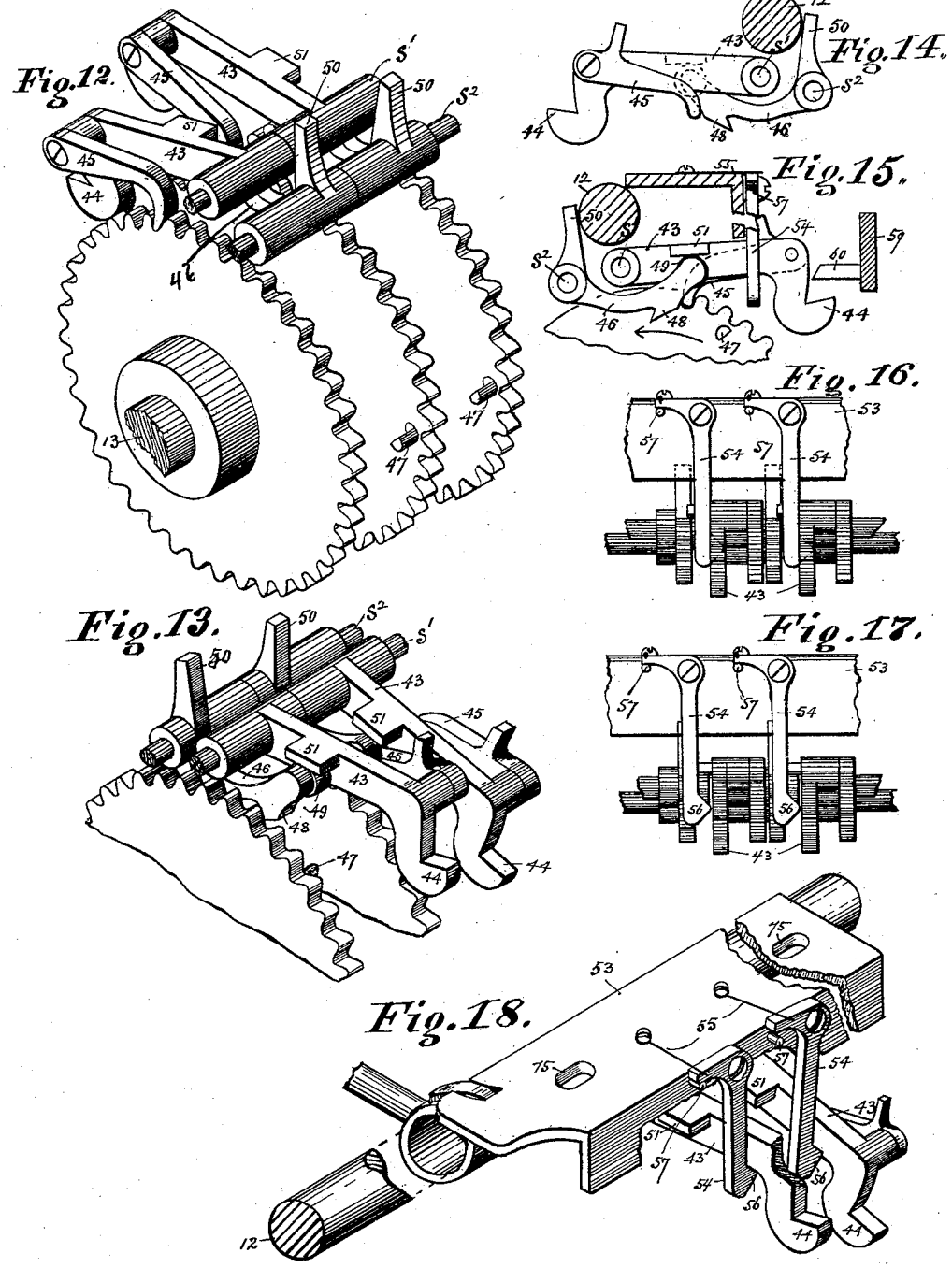

(No Model.) 11 Sheets—Sheet 8.

J. F. PFEFFER.
CASH REGISTER.

No. 468,945. Patented Feb. 16, 1892.

Attest:
Alfred M. Hamow
Wm G. Hosea

Inventor:
John F. Pfeffer
By L. M. Hosea
atty (No Model.) 11 Sheets—Sheet 9.

J. F. PFEFFER.
CASH REGISTER.

No. 468,945. Patented Feb. 16, 1892.

Attest:
Alfred M. Hansen
Wm G Hosea

Inventor:
John F. Pfeffer
By L. M. Hosea
atty (No Model.)
11 Sheets—Sheet 10.

J. F. PFEFFER.
CASH REGISTER.

No. 468,945.
Patented Feb. 16, 1892.

Attest:
Alfred M Harrison
W. G. Hosea

Inventor:
John F. Pfeffer
By L. M. Hosea
atty (No Model.) 11 Sheets—Sheet 11.

J. F. PFEFFER.
CASH REGISTER.

No. 468,945. Patented Feb. 16, 1892.

Attest:
Alfred M. Harrison
Wm. G. Hosea

Inventor
John F. Pfeffer
By L. M. Hosea
Attorney

UNITED STATES PATENT OFFICE.

JOHN F. PFEFFER, OF CINCINNATI, OHIO.

CASH-REGISTER.

SPECIFICATION forming part of Letters Patent No. 468,945, dated February 16, 1892.

Application filed April 16, 1891. Serial No. 389,240. (No model.)

*To all whom it may concern:*

Be it known that I, JOHN F. PFEFFER, a citizen of the United States, residing at Cincinnati, Ohio, have invented new and useful Improvements in Cash-Registers, of which the following is a specification.

My invention relates to cash-registers, its object being to simplify the construction and render the same more certain and efficient in operation.

The general features to which the improvements are principally directed are, first, to the mechanism controlling the operation of the key-levers, whereby but one of a group can be operated at a time, but several keys, each of a different group, may be operated together to produce a corresponding total registry; second, to the mechanism for compelling the completion of a key action once begun and the return of the key or keys to the initial or starting position before any others can be operated; third, to the mechanism for locking and retaining all the unused keys in the initial position while any key or set of keys is being operated; fourth, to the mechanism for insuring the dropping of the last elevated indicating-tablet upon the elevation of a new one; fifth, to means for preventing the inaccurate operation of the register-wheels by a too sudden or violent manipulation of the keys; sixth, to a method of and means for transmitting or "carrying ten" upon the register-wheel system to preserve grand totals.

Mechanism illustrating my invention is illustrated in the accompanying drawings, in which—

Figure 2:
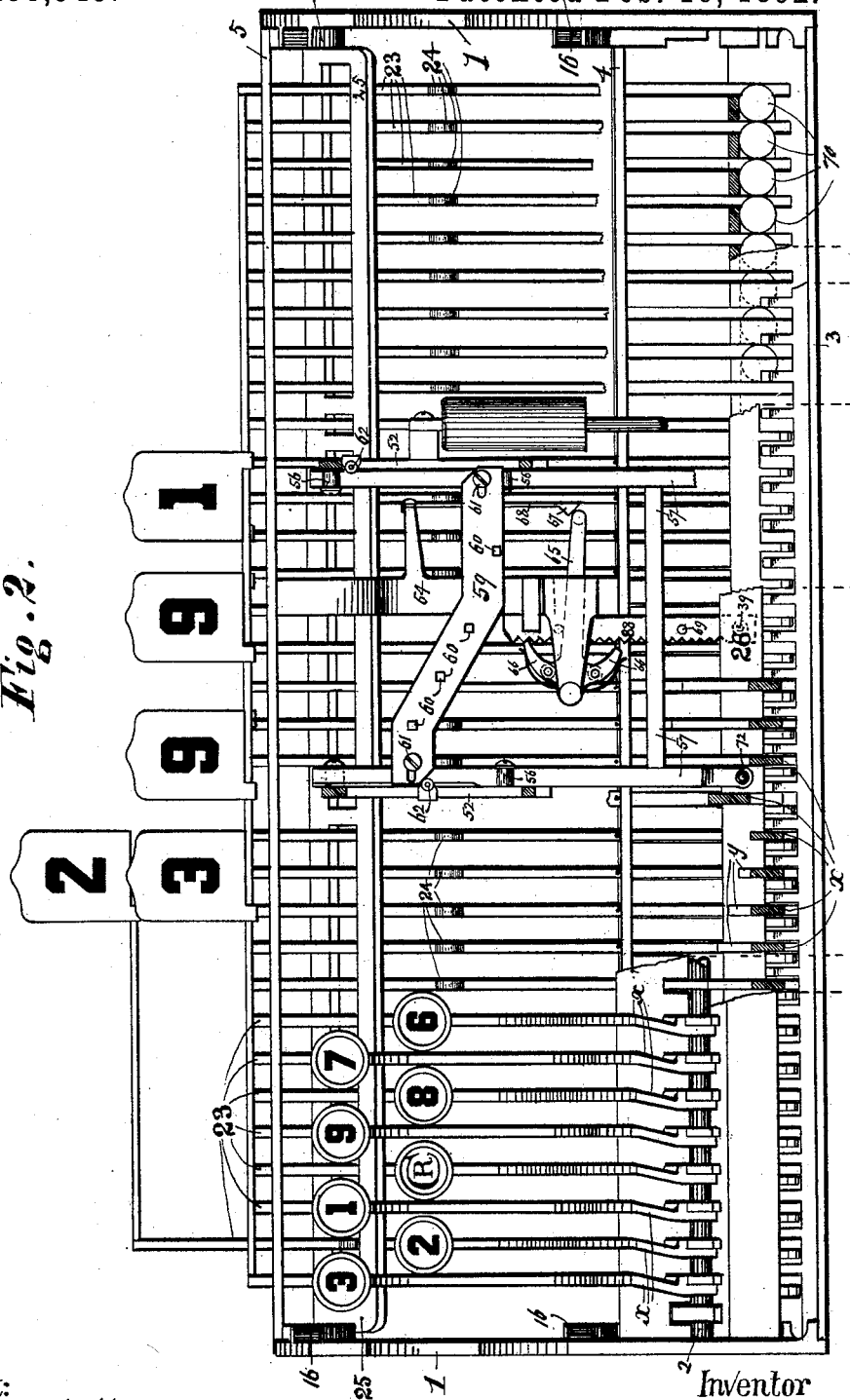
Figure 19:
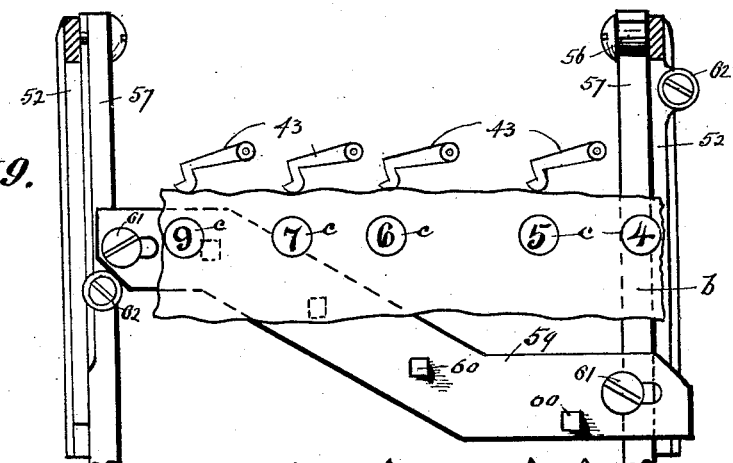
Figure 20:
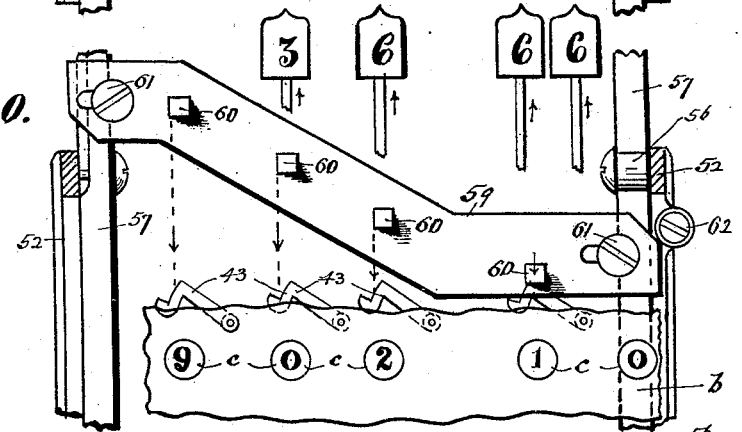
Figure 21:
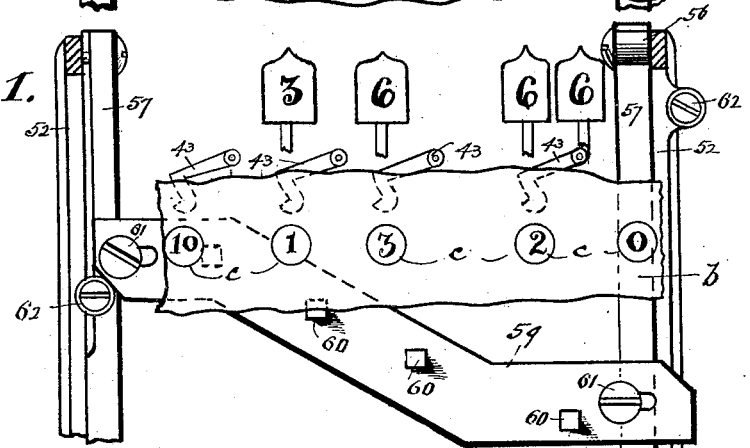
Figure 22:
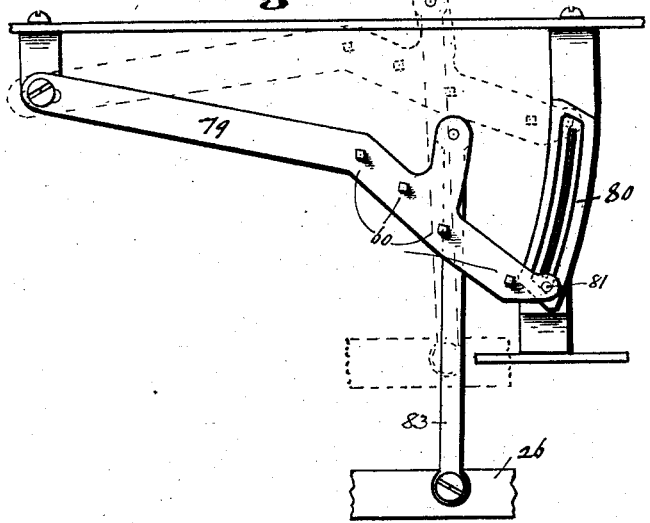
Figure 23:
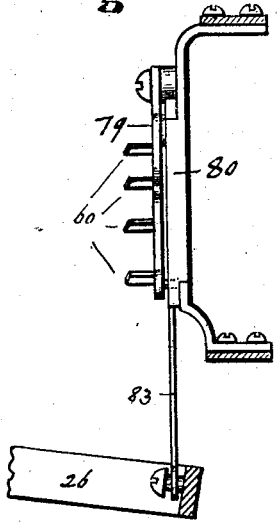
Figure 25:
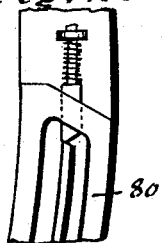
Figure 24:
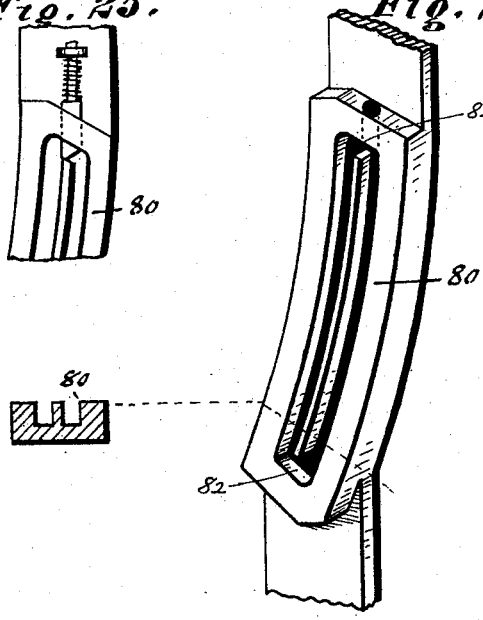
Figure 26:
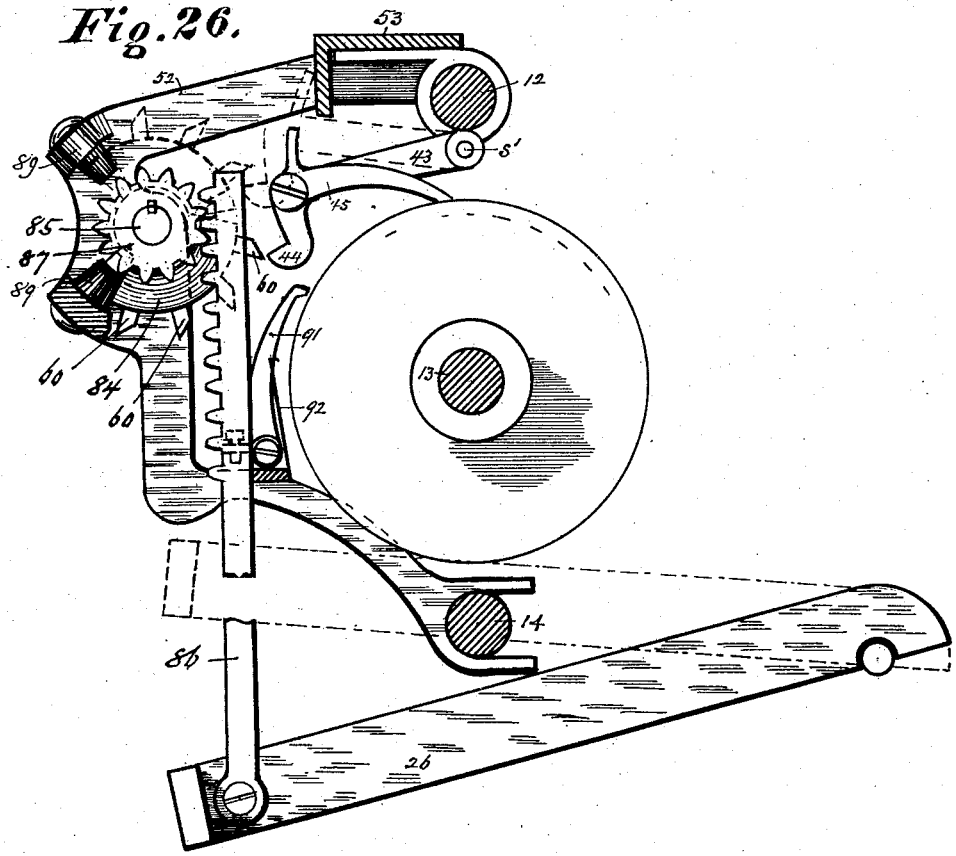
Figure 27:
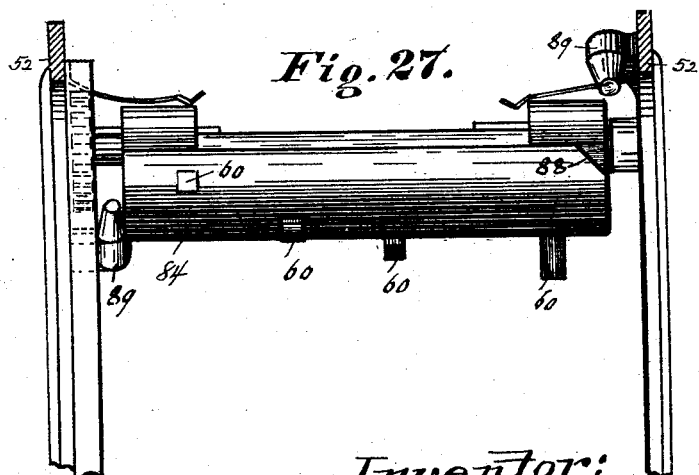
Figure 28:
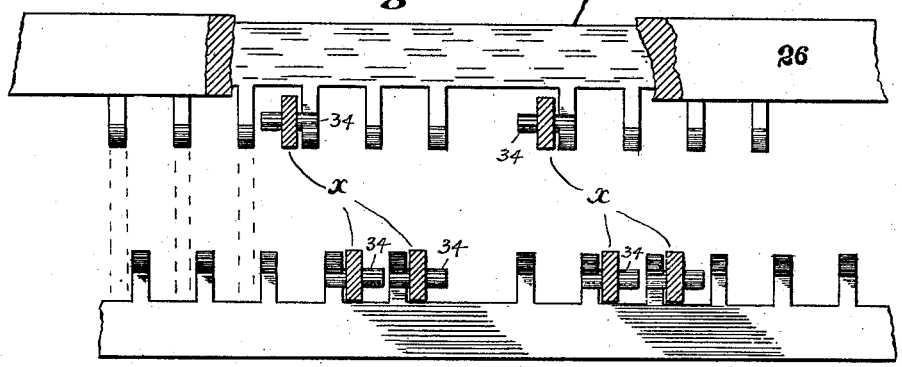
Figure 29:
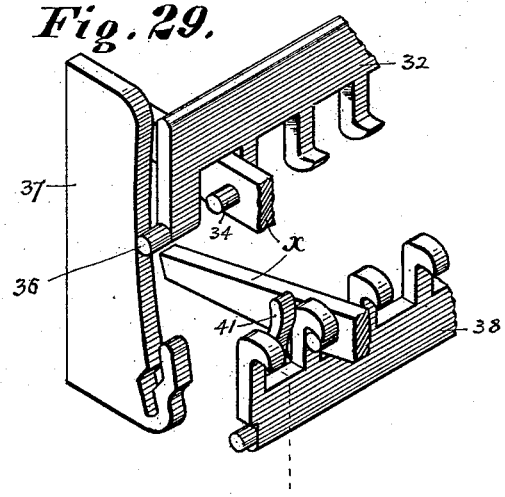
Figure 30:
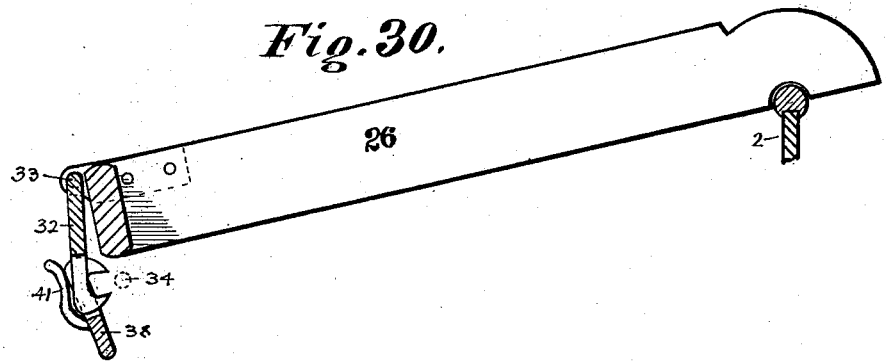

Figure 1, Sheet 1, is a plan view of the working parts of a cash-register complete embodying my improvements. Fig. 2, Sheet 2, is a partial front elevation with parts broken away to show portions of the operative mechanism. Fig. 3, Sheet 3, is a partial cross-section exhibiting certain portions of the supporting-frame and also the tablet-dropping mechanism; Fig. 4, Sheet 4, a cross-sectional elevation of the machine complete; Fig. 5, Sheet 5, an enlarged side elevation of the yoke-locking mechanism; Fig. 6, a perspective elevation of the supporting and guide plate for the holding-pawls and rack-bar employed in the yoke-locking mechanism; Fig. 7, a detached detail of the rocking lever and pawl construction; Fig. 8, a perspective detail of the rack-bar; Fig. 9, Sheet 6, a plan view of the system of transmitting-pawls; Fig. 10, a side elevation of one of the pawl-carriers and its lifter, also of the front and rear holding-pawls for the register-wheels; Fig. 11, a front elevation of two adjacent toothed register-wheels, showing the pawl-carrier, transmitting-pawl, and retaining-hook; Fig. 12, Sheet 7, and Fig. 13, perspective views from opposite sides of the pawl-carriers and transmitting-pawls, showing their relation to the register-wheels and their cogs; Figs. 14 and 15, detail elevations, from opposite sides, of the pawl-carriers and transmitting-pawls; Figs. 16 and 17, detail views of two of the supporting-hooks in the opposite positions of the shifting plate; Fig. 18, a perspective view of the shifting plate, showing retaining-hooks in and out of engagement; Figs. 19, 20, and 21, Sheet 8, diagram elevations of the pawl-engaging plate in lowest position, highest position, and lowest position as returned, respectively, showing diagrammatically its action upon the transmitting-pawls and the corresponding effect upon the register-wheels; Figs. 22, 23, 24, and 25, Sheet 9, details of a modification in the mechanism for operating the transmitting-pawls; Figs. 26 and 27, details of a further modification in the mechanism for operating the transmitting-pawls; Figs. 28, 29, and 30, details of the couplers for locking the key or keys in use to the yoke and retaining the unused keys.

It may be premised that many of the general structural features of the register exhibited as embodying my invention are common in this class of machines—viz., a series of key-levers horizontally arranged and divided into groups, a pivotal actuating-yoke for each group, actuated differentially by the several keys of a group, a toothed pawl carried by each yoke, and a register-wheel for each group, actuated directly or mediately by the yoke-pawl of that group.

Referring now to the drawings, A designates the general supporting-frame of the machine, consisting of end plates 1 1, a front cross bar or plate 2, in and upon which the key-levers are fulcrumed, and rear cross-braces 3 4 5, of which the bottom cross-brace 3 forms the lower rear resting-support of the key-levers. The central cross-brace 4 constitutes a guide and lower resting-support for the tablet-stems, and the upper cross-bar 5 constitutes a guide for said tablet-stems.

The key-levers $x$, in horizontal series and divided into groups designating consecutive decimal places, the keys of a group designating the consecutive unit value of a given decimal place, the register-wheels 6 7 8 9 10 actuated ultimately by the groups of keys, respectively, the transmitting-yokes 11, whereby each group of keys actuates its appropriate register-wheel differentially—all of these in respect to their general arrangement and functions do not differ materially from other well-known constructions of this type of machines, except as hereinafter referred to, and require no extended description.

The register-wheels are carried side by side loosely upon a pivot-bar 13, which, together with similar parallel bars 12 and 14, connected by supporting-braces 15, constitute an independent supporting-frame for the registering mechanism and are held in socket-bearings 16 at the inner sides of the end plates 1 in proper relations with the key-lever system.

The pawl-operating yokes 11 for the key-groups are pivoted in the present case upon an independent pivot-bar 17, carried by brackets 18 upon the bar 14 as a support. The rear cross-bars 19 of the yokes carry toothed operating-pawls 20. The operating-pawl of the central yoke, appropriated to the group of tens-keys, (dimes,) engages its appropriate register-wheel directly, while the operating-pawls of the yokes at either side appropriated to the units (cents) and hundreds (dollars) groups of keys, respectively, engage ratchet-wheels 21 upon corresponding counter-shafts 71, (shown in dotted lines, Fig. 4,) which transmit their motion by means of spur-gears (not shown) in the ordinary manner to their appropriate register-wheels. This, being a common construction, requires no further description. The yokes are themselves actuated by graduated projections $y$, Figs. 1 and 3, upon the key-levers in the manner common in this type of machines to rotate the register-wheels a given distance to effect the proper registry. In the present case I have shown the yokes 11 as completed across the front in rectangular form and provided with projections 22, Fig. 4, for operating a portion of a printing-recorder fully described in another application pending herewith; but as such printing-recorder is independent of and constitutes no part of my present invention I have omitted its further illustration and description here.

The tablet-stems 23, Fig. 4, in the present case are independent of each other and of the keys, standing supported and guided, as before indicated, but in the path of the key-levers $x$, respectively, being raised by lifting contact of the keys toward the conclusion of the upward key movement. Each stem is provided with a projection 24, which passes through and subsequently engages in and upon a pivoted wing 25 in the manner common in this type of machines.

To secure the proper lift of the wing 25 at the operation of each subsequent key so as to drop the tablet-stem previously engaged, I employ the following mechanism, Fig. 3: The machine is provided with a general rectangular yoke 26, having several important functions. It is pivoted to the common key-pivot 2 and rests across the entire key system at the rear and consequently is lifted a uniform distance by each key. The yoke 26 carries at the rear a projection 27, (shown in dotted lines, Fig. 3,) which in rising engages a stop or lug upon an independent stem 28, the stem thus lifted being guided and supported in the same manner as one of the series of tablet-stems 23, but prolonged downward beside and below the yoke projection 27 to furnish a lower engaging stop or lug 29, by which, upon the descent of the yoke, the stem is brought down again to its starting position. The independent stem 28 is provided, in proper relations with the wing 25, with a pivoted lifting-pawl 30, having a spring 31 to hold it normally outward, as shown, so that upon raising the yoke the pawl 30 lifts the wing 25 outward beyond the limits of the tablet-stem projections 24, allowing the previously-supported tablet-stem to drop. At a given point the pawl 30 passes above and disengages the wing, allowing the latter to drop down and engage the newly-raised tablet-stem in the usual manner. As the yoke 26 drops down after the operation of a key it carries down toward the conclusion of its movement the independent stem 28, as explained, the pawl 30 being forced back by its downwardly-sliding engagement with the wing against the force of its spring until the wing is passed, when the pawl again resumes its original engaging position below the wing.

To the yoke 26 is also assigned another important function—viz., that of compelling the completion of a key movement once begun in either direction—the mechanism for which comprises the following elements—viz., first, means for coupling any key of the entire series to the yoke by its own lifting action upon the same; second, means for compelling the completion of the yoke movement in either direction.

The mechanism for coupling a key or keys to the yoke consists of a serrated coupling-wing 32, Figs. 1, 3, 4, 28, 29, and 30, suspended by end pivots 33 to and immediately behind the rear cross-bar of the yoke. Its teeth project downwardly beside the key-levers $x$ and are hooked to engage upon lateral pins 34 upon the keys. When the key $x$ and yoke 26 are in lowest position, Figs. 3, 4, and 30, the wing 32 stands swung outward from the yoke, so that its hooks disengage the keys; but when any key is operated and the yoke raised the wing is carried up with it, and immediately after clearing the keys is moved inward the proper distance to hook under the key, thus coupling it to the yoke for the time being.

The movement of the wing 32 in relation to the yoke 26 is effected by a projection 36 at one or both ends, which stands outward eccentric with the pivotal support of the wing and engages in a slotted guideway formed in a plate 37, attached to the frame of the machine. The guideway at its lower portion is inclined outward toward the rear, presenting cam-surfaces, which oscillate the wing away from the yoke, releasing the coupled key or keys when the yoke is in its lowest position, as shown in Figs. 3, 4, and 30. Upon raising the yoke these surfaces force the wing toward the yoke, all hooks of the wing first clearing the pins of all the keys excepting the particular key or keys raised and performing the work of raising the yoke, which is or are held coupled by its or their particular hook or hooks to the wing. The upper portion of the guideway is formed to an arc struck from the center of pivotal action of the yoke, so that the wing is held absolutely to its proper position of locking the operating-key to the yoke at all portions of the movement until its final return to the starting-point without possibility of disengagement while the key is in operation, so that no jarring of the machine or any other accidental cause short of actual breakage of parts can release the connection of the key or keys operating the yoke until they have completed its functions and returned to the initial starting-point. It will thus be obvious that by the application to the yoke 26 of devices for compelling its movement to a conclusion in either direction when once begun the operation of any key or keys in the entire series coupled thereto is similarly compelled. The mechanism for effecting this result consists of a rack-bar 88, Figs. 1, 2, 4, 5, and 8, moving vertically in guides upon a frame 64, attached to the main frame of the machine, the rack-bar having at the lower end a slot engaging over a pin 39, projecting from the yoke 26, so that it is carried up and down by the oscillation of the yoke. A T-lever 65, centrally pivoted adjacent to the rack-bar, carries pivoted pawls 66 at the short ends, engaging alternately the teeth of the rack-bar 88. The central arm of the T-lever 65 is extended forward and oscillates to opposite sides of a wedge-shaped projection 67 upon a spring-bar 68, attached to a projection of the frame 64, by which the lever is held in ultimate positions. Upper and lower projections 69 upon the rack-bar engage the long arm of the T-lever 65 alternately and carry it over the projection to ultimate positions, thus shifting the engaging-pawls 66 alternately into and out of engaging relations with the rack-bar 36. By this means when the movement of the yoke 26 begins upward the pawl engagement with the rack-bar permits it to continue, but prevents a downward movement. As the yoke reaches its highest position it shifts the pawl engagement with the rack-bar, allowing the yoke to descend, but preventing its return, until upon reaching its lowest position, the T-lever is shifted over to again permit the ascent.

It will be obvious that the coupling mechanism described will couple more than one key to the yoke in case two or more are simultaneously operated, the function and limit of the coupler or locking bar being to temporarily couple the key or keys being operated to the general yoke 26. In the cash-register described it is intended to permit the operation of one key of each of the several groups simultaneously, and only one of each group. To accomplish this result, I employ any suitable key-locking device, of which many forms are well known, that shown, Figs. 2, 3, and 4, being a slotted disk or ball alley arranged above and transversely to the keys of a group at the rear, in which disks or balls 70 of slightly less diameter than the distance between the central vertical planes of adjacent keys are arranged with end play in the alley equal to the thickness of a key.

The construction and operation being well known, I need not give a more detailed description. Each group of keys being so provided, but one of a group can be operated at one time. In addition to such or a key-locking device applied to each group I employ a locking device applied to the entire series of keys, as follows: An inverted duplicate 38 of the coupler 32 is pivoted to the frame of the machine below the keys at the rear of the pins 34, the serrations projecting upward and lying at the opposite sides of the keys from those occupied by those of the wing 32. The bar 38 is normally held by a spring 40 in such position that its hooks lie over the pins 34 of all the keys while in their lowest position excepting when forced out of said position. As already explained, the wing 32 is, at the lowest position of the yoke 26, held away from the yoke by the inclined face of a guide slot in the plate 37, against which its actuating-pin 36 travels. This change of position occurs just before the yoke 26 reaches its lowest position, and the movement of the wing 32 thus produced is utilized to force the wing 38 out of and hold it out of engagement with the keys. It is accomplished by one or more cam projections 41 upon the wing 38, which lie in the path of corresponding serrations of the wing 32 and are engaged simultaneously with the outward movement of the wing 32 at the lower terminus of the yoke movement, as above explained, so that while the keys are at their lowest position of rest both wings are disengaged from the pins 34 of the keys; but upon elevation of the yoke the lower wing 38 is released and immediately engages all the the keys and retains them until the yoke 26 again returns to its original position.

The construction and operation of the registering mechanism are as follows: The register-wheels are mounted and rotate loosely upon the common central shaft 13, before described, and indicate cents, dimes, dollars, tens of dollars, hundreds of dollars, &c., and a credit-wheel 72, independently actuated by a credit-key by direct pawl connection. The transmitting devices, however, are peculiar and operate in a novel manner. Pivoted upon a common shaft S′ above the series of register-wheels (see Figs. 4 and 10 to 15, inclusive) is a corresponding series of pawl-carriers 43, each having its forward end projected into a hook 44 and carrying pivoted at one side a trailing pawl 45, lying upon the toothed periphery of the next higher register-wheel. Pivoted upon an independent shaft $S^2$, a little to the front and below shaft S′, is a series of lifting-paws 46 in the path of the lateral transmitting projections 47 of the registering-wheels, respectively. The lift-pawls 46 are each provided with a cam projection 48 at the under side and with a lateral terminal wrist, which may carry a friction-roller 49, which when the lift-pawl is raised by the engagement of the teeth 47 rises against a projection 51 upon the pawl-carrier 43, lifting it and carrying its trailing pawl 45 back one tooth upon the cogged periphery of the next higher register-wheel. At their rear ends the lift-pawls 46 are extended upward into stops 50, which rest against the shaft 12 and keep the pawls from dropping down, but maintain them in proper position for engagement by the lateral teeth 47 of the register-wheels.

Means are provided for maintaining the pawl-carriers 43 thus lifted temporarily in their elevated position, as follows: Just over the shaft 12 upon side bars 52, constituting a small frame to be more fully referred to later, is secured a plate 53, adjustable laterally in a manner and by means presently to be described, to the front of which is pivoted a series of bell-crank hooks 54, whose longer arms, Fig. 18, depend alongside of the pawl-carriers 43, each to engage the same when lifted and by which the pawl-carriers are held upraised. The upper short arms of the bell-crank hooks 54 lie adjacent to the front of the plate 53 and are held down by small springs 55. Normally the short arms of the bell-cranks 54 are held down by the springs 55 against stop-pins 57, projecting from the front of the plate 53 as a limit of their action, in which position the hooks 56 lie in the path of the pawl-carriers 43, and the upward movement of the latter shove the arms 54 aside against the opposing force of their springs 55 until the pawl-carriers are lifted above the hook projections of the bell-cranks, when the latter resume their original position with the hook projections below the pawl-carriers 43, retaining the latter in their elevated positions. In such elevated position to which the pawl-carrier 43 is brought by the lateral or "transmitting" teeth of a given register-wheel upon the downstroke of the key-lever its trailing pawl 45, which engages the next higher register-wheel, has trailed forward over one tooth of the latter and now lies behind the same, ready to move said higher wheel one tooth by the restoration of the pawl-carrier to its normal position. This is accomplished upon the return stroke of the key by independent mechanism presently to be described; but it may be noted here as an important feature of the system of registering that the initial registering upon each wheel is effected upon and by the down or direct movement of the keys, while by said movement the "carrying" or transmitting pawls are merely set in position to effect the carrying and do not act until the return movement of the keys after all direct registering is completely finished. The movement will be further illustrated later in a practical example.

The mechanism by which the carrying-pawls is operated is as follows: Reference has already been made to side bars 52, constituting a frame, Figs. 3, 4, and 9, two of which bars are secured parallel to each other and between the cross-shafts 12 and 14. The rear vertical portions of these frames constitute guides, upon which are pivoted friction-rollers 56, between which rollers and the side bars 52 moves a "gate" or cross-head 57, consisting of two parallel upright bars connected rigidly by a cross-brace, Fig. 2, and extended downward to engage upon pins 72 upon the yoke 26, by which the cross-head is raised and lowered by the movement of the yoke 26. Across the front of the gate or cross-head is carried a plate 59, inclined end to end, so as to carry a series of projections or teeth 60 in echelon vertically and corresponding in lateral position and number with the pawl-carriers 43. This plate 59 is carried upon the gate or cross-head 57 by means of horizontal slots upon pins 61, and two of its diagonally-opposite corners are beveled to engage stops 62 upon the respective side bars 52 to thrust the plate longitudinally aside into extreme positions at opposite limits of its vertical movement. By this means the teeth 60 in the upward movement of the plate 59 pass the pawl-carriers 43 without contact, but near the upper limit of the movement of the plate is thrust to its opposite position, so that in descending the teeth 60 engage the extremities 44 of the pawl-carriers, respectively, one after another in order (such as stand raised) and pull them downward successively, thus effecting the carrying function through the trailing pawls, as before described. In descending the pawl-carriers 43 by their arc of movement disengage at their proper limit and allow the plate to pass on. When near its lowest limit, the plate 59 is shifted back to its original or starting position. The nature and effect of the movement will be best understood by the practical illustration before promised.

In Figs. 19, 20, and 21 are shown in successive vertical positions, diagrammatically, first the relative position of the register-wheels (shown by a portion *b* of the covering-plate with figures on the register-wheels indicating $9, 7, 6, 5, and 4 in the "peep-holes" *c*) carrying-plate 59, and the pawl-carriers 43 in the position of rest; second, the relative position of the parts at the downstroke of keys, adding $36 66, as shown upon the tablets now elevated, (these sums being selected because all the pawl-carriers will be actuated in the process,) and, third, the relative position of the parts when the keys have returned to their normal position of rest after the entire completion of their movement in both directions.

It will be seen by the second illustration, Fig. 20, that the immediate effect of the direct stroke of the keys will indicate upon the register-wheel system the last or right-hand figure of each separate addition—that is, 9, 0, 2, 10—while the carrying of the tens is performed later in each case successively from the right—that is, from the lowest to the highest decimal place in series upon the return-stroke of the keys. Thus, beginning with the cents, as 6+4=10, the 0 is registered and the appropriate pawl-carrier is set ready to carry the 1 ten. In the hundreds place 5+6=11, the 1 being immediately indicated upon the tens-wheel and the appropriate pawl-carrier set to carry the 1 hundred, and similarly through the series. Then as the plate 59 descends the pawl-carriers act successively from the right, the echelon arrangement of the teeth 60 permitting each wheel to reach its proper position before the next higher is operated upon, the incidental effect of which arrangement is also to distribute the mechanical resistance of the several engagements over successive periods of the return stroke instead of concentrating them at one period. At the conclusion, the tens being thus carried the register-wheels indicate the true total, 1013.20, while the tablets, indicating 3666, (the amount added,) remain up, as indicated in Fig. 10. The shifting plate 53, it may now be explained, is given a longitudinal shifting adjustment in order merely to throw the supporting-hooks 54 for the time being out of engagement with the pawl-carriers 43 when it is desired to reset the register-wheels in order that the transmitting mechanism may be in proper position for the subsequent action of the machine. The plate rests across the top of the side bars 52 and is held by guide-screws 74, passing through longitudinal slots 75 of the plate. It is moved laterally by means of a spiral cam 76, turning loosely upon the shaft 12 and engaging in a recess of the plate, thereby shifting all the supporting-hooks aside away from the pawl-carriers.

To permit the resetting of the register-wheels to zero, the shaft 13, upon which they are loosely mounted, is provided with a longitudinally-extended groove, and each register-wheel is provided with a spring-pawl 78, attached to the register-wheel in a recess 79 of its hub and engaging in the groove of the shaft. (See Figs. 10 and 11.) The shaft being turned, the register-wheels are "picked up" one after another and carried around together until they show zero at the peep-holes of the casing. This arrangement forms no part of the present invention and requires no further description here.

I have shown varieties of the cross-head and shifting plate with projections to engage the pawl-carriers in Figs. 22 to 25, inclusive, and in Figs. 26 and 27. The first of these consists of a pivoted bar or plate 79, fixedly pivoted at one end by a longitudinal slot to the supporting-frame of the machine and guided at the other by a pin or projection 81 of the plate, entering a fixed cam 80, curved to the arc of movement of the plate 79. The cam has two parallel guide-paths connected at the extremities, and the oscillating plate is guided therein and longitudinally shifted by contact of the pin 81 with inclined surfaces 82 at each end, so that pins 60—such as those upon the shifting plate 59, before described—describe different but parallel arcs as the plate is oscillated upward or downward. The parts are so arranged that the pins 60 pass by the hooked extremities 44 of the pawl-carriers 43 in going up and engage them in coming down. The movement is effected by a link 83, connecting the plate 79 with the yoke 26.

The second variant is a revolving segment of a cylinder 84, carried by a spline engagement upon a shaft 85, journaled in and between the plates 52. The pins 60 are carried upon the periphery of the segment and engage the pawl-carriers 43 by the same rotation of the segment which is accomplished by a rack-bar 86, connected to the yoke 26 and engaging a pin 87 upon the shaft. At each extremity of semi-rotation the segment engages, by means of beveled surfaces 88, rollers 89, arranged at each end upon the frame 52, by which the segment is shifted longitudinally upon the shaft 85 in the same manner and for the same purpose as the plate 59 upon its cross-head 57.

To insure the exact operation of the register-wheels against overrunning, which might occur through too sudden or violent action of the keys, I employ, in addition to the ordinary holding-pawls 90, which engage at the front side to prevent back-lash, an additional series of pawls 91 at the rear. These are provided with springs 92, by which they are normally held out of engagement with the cogged register-wheels and with rear projections 93, against which the cross-brace of the cross-head 57 strikes just at the conclusion of its upward movement and forces the pawls 91 into engagement with the toothed register-wheels each to each throughout the series and holds them firmly against overrunning. The projections 93 are provided with adjusting-screws 94 to regulate the movement with accuracy.

I claim as my invention and desire to secure by Letters Patent of the United States—

1. In a cash-register, the combination of a horizontal series of key-levers for actuating the register-wheels, divided into groups designating several consecutive classes of unit values, an independent locking device for each group, permitting the actuation of but one key of a group at a time, a yoke operated in common by any key or keys of the entire series, means for automatically coupling an operating key or keys to the yoke while operating, and mechanism for compelling the complete actuation of the yoke to the full limit of key movement and its return to the starting position, substantially as set forth.

2. In a cash-register, the combination of a series of independent register-wheels, a series of key-levers divided into groups, each group appropriated to its independent register-wheel, connecting mechanism between each key group and its register-wheel, actuated differentially by the several keys of a group by uniform movement of the keys, a locking device applied to the entire series of keys and operated by any one key of the entire series or by several keys, one of each of one or more groups simultaneously, to compel the completion of the key movement and return to starting position, and locking mechanism for each group preventing the actuation of more than one key of said group at a time, substantially as set forth.

3. In a cash-register, in combination with a series of manipulating-keys, a yoke operated in common by any key or keys and provided with mechanism to couple said actuating key or keys thereto during its movement, a rack-bar permanently connected with and operated by said yoke, a bell-crank pawl-lever pivoted to the frame adjacent to the path of said rack-bar and carrying two oppositely-engaging pawls, lugs upon the rack-bar, engaging said pawl-lever at opposite limits of movement, and a spring holding the lever temporarily at opposite positions, whereby the movement of the yoke once begun is permitted, but its return prevented by the pawl then engaged by the rack-bar and the pawl-lever thrown by the rack-bar at the conclusion of its movement to engage the opposite pawl, permitting and compelling the return of the yoke to its initial position, substantially as set forth.

4. In a cash-register, in combination, a series of manipulating-keys, indicating tablets and stems provided with projections, a pivoted retaining-wing in the path of said stems, an independent stem also in the path of said wing and operated in common by any key of the entire series, and a pivoted lifting-pawl upon said independent stem arranged to raise said wing beyond the limit of the tablet-stem projections and drop the last-raised tablets and immediately thereafter pass the wing and allow it to drop and sustain the newly-raised tablet, substantially as set forth.

5. The combination, in a cash-register, with a series of independent register-wheels representing successive multiple or place values of an integral total amount, actuated upon and by the direct motion of the keys, a corresponding set of pawl-carriers arranged between each wheel and the next higher in representative value, carrying pawls acting upon the next higher wheels, respectively, and a series of lifters adapted to be actuated by the register-wheels, respectively, to lift the pawl-carriers so as to place the transmitting-pawls in position, of means, substantially as described, connected with the key system for operating the raised pawl-carriers in succession by and during the reverse or return movement of the keys, substantially as set forth.

6. In combination with the register-wheels provided with lateral teeth, the pawl-carriers, the lifters, the transmitting-pawls, and the yoke operated by the keys, a moving element actuated by the yoke past the pawl-carriers in the direct or upward movement and engaging the pawl-carriers in the return or downward movement, substantially as set forth.

7. In combination with the register-wheels, the pawl-carriers, and the lifters, a series of spring retaining-hooks, arranged and operating substantially as set forth.

8. In combination with the register-wheels, pawl-carriers, and the lifters, the sliding plate arranged above the pawl-carriers, and the series of spring-hooks depending therefrom adjacent to the pawl-carriers, each to each, substantially as set forth.

9. In combination with the manipulating-keys, the register-wheels, their actuating mechanism, and the system of transmitting-pawls arranged and operating, as described, the main yoke, the cross-head connected therewith, and the laterally-adjustable plate upon the cross-head, provided with pins or projections arranged in echelon, substantially as set forth.

10. In combination with the main yoke, the cross-head, the plate having beveled ends and secured thereto by a slotted connection, the engaging pins upon the plate, and the projections or rollers upon the cross-head guide-frame in the path of the plate at its opposite beveled ends, substantially as set forth.

11. In a cash-register, in combination with its series of manipulating key-levers, a yoke lying across and operated by any one or more of said keys, a coupling bar or wing pivoted to the rear of said yoke, having a series of hooks depending at the side of the keys, respectively, to engage the key or keys being used, a projection at one or both ends of said wing, and a guide-plate at one or both ends of the machine to move the wing to engage the actuating key or keys upon lifting the yoke and hold the same absolutely engaged during the movement and release the same at the conclusion of the movement, substantially as set forth.

In testimony whereof I have hereunto set my hand in the presence of two subscribing witnesses.

JOHN F. PFEFFER.

Witnesses:
L. M. HOSEA,
WM. G. HOSEA.